United States Patent
Voldsbekk (10) Patent No.: US 9,250,343 B2
(45) Date of Patent: *Feb. 2, 2016

(54) RIGID-STEM SURVEY METHOD AND SYSTEM

(71) Applicant: PGS Geophysical AS, Lysaker (NO)

(72) Inventor: Rune Sindre Voldsbekk, Drammen (NO)

(73) Assignee: PGS Geophysical AS, Oslo (NO)

( * ) Notice: Subject to any disclaimer, the term of this patent is extended or adjusted under 35 U.S.C. 154(b) by 310 days.

This patent is subject to a terminal disclaimer.

(21) Appl. No.: 13/729,233

(22) Filed: Dec. 28, 2012

(65) Prior Publication Data

US 2014/0185410 A1    Jul. 3, 2014

(51) Int. Cl.
| | |
|---|---|
| *G01V 1/38* | (2006.01) |
| *B63B 21/66* | (2006.01) |
| *B63B 21/56* | (2006.01) |
| *G01V 1/20* | (2006.01) |

(52) U.S. Cl.
CPC .... *G01V 1/38* (2013.01); *G01V 1/202* (2013.01); *G01V 1/3843* (2013.01); *B63B 21/56* (2013.01); *B63B 21/66* (2013.01); *G01V 2001/204* (2013.01)

(58) Field of Classification Search
CPC ........ G01V 1/201; G01V 1/3843; B63B 21/66
USPC ...................................................... 367/15, 20
See application file for complete search history.

(56) References Cited

U.S. PATENT DOCUMENTS

| | | | | |
|---|---|---|---|---|
| 3,452,327 | A | * | 6/1969 | Clynch ......................... 367/173 |
| 3,794,965 | A | * | 2/1974 | Charske ......................... 367/18 |
| 4,038,630 | A | * | 7/1977 | Chelminski ..................... 367/23 |
| 4,108,101 | A | * | 8/1978 | Schirtzinger ................. 114/245 |
| 4,781,140 | A | | 11/1988 | Bell et al. |
| 4,881,210 | A | * | 11/1989 | Myers et al. .................. 367/173 |
| 6,775,204 | B2 | | 8/2004 | Scott |
| 6,903,998 | B2 | | 6/2005 | Vaage |
| 7,028,988 | B2 | | 4/2006 | Scott |
| 7,142,481 | B1 | | 11/2006 | Metzbower et al. |

(Continued)

FOREIGN PATENT DOCUMENTS

| | | |
|---|---|---|
| GB | 1299824 A1 | 12/1972 |
| GB | 2338220 A | 12/1999 |

(Continued)

OTHER PUBLICATIONS

UK Search Report mailed on Mar. 21, 2014, in application No. GB1322654.3, 4 pages.

*Primary Examiner* — Ian J Lobo (57) ABSTRACT

Disclosed are methods and systems for using a rigid-stem assembly comprising a plurality of interconnected rigid stems in a marine survey. An embodiment discloses a geophysical survey method comprising: deploying a rigid-stem assembly from a survey vessel into a body of water, wherein the rigid-stem assembly comprises a plurality of rigid stems that are interconnected and each comprise a stem body defining one or more interior chambers; towing the rigid-stem assembly from the survey vessel through the body of water; and either (1) detecting a geophysical signal with a sensor towed by the survey vessel, and/or (2) activating a geophysical source that is towed by the survey vessel. Also disclosed are survey systems and rigid-stem handling systems.

24 Claims, 6 Drawing Sheets

(56) References Cited

U.S. PATENT DOCUMENTS

| | | |
|---|---|---|
| 7,167,412 B2 | 1/2007 | Tenghamn |
| 7,221,619 B1 | 5/2007 | George |
| 7,260,024 B2 | 8/2007 | Goujon et al. |
| 7,298,672 B1 | 11/2007 | Tenghamn et al. |
| 7,352,654 B2 | 4/2008 | Goujon et al. |
| 7,426,439 B2 | 9/2008 | Ozdemir et al. |
| 7,641,421 B2 | 1/2010 | Roodenburg et al. |
| 7,737,698 B2 | 6/2010 | Tenghamn et al. |
| 7,778,114 B2 | 8/2010 | Goujon et al. |
| 7,800,976 B2 | 9/2010 | Stokkeland et al. |
| 7,834,632 B2 | 11/2010 | Tenghamn et al. |
| 7,974,152 B2 | 7/2011 | Tenghamn |
| 8,021,080 B2 | 9/2011 | Frivik et al. |
| 8,102,731 B2 | 1/2012 | Cambois |
| 8,267,031 B2 | 9/2012 | Austad |
| 2007/0266804 A1 | 11/2007 | Goujon et al. |
| 2008/0117717 A1* | 5/2008 | Borgen et al. ............... 367/20 |
| 2008/0267009 A1 | 10/2008 | Frivik et al. |
| 2009/0092006 A1 | 4/2009 | Teigen et al. |
| 2009/0161487 A1 | 6/2009 | Kjellgren et al. |
| 2010/0020637 A1* | 1/2010 | Welker et al. ............... 367/16 |
| 2010/0149910 A1* | 6/2010 | Martin ............... 367/17 |
| 2010/0170428 A1* | 7/2010 | Toennessen ............... 114/249 |
| 2010/0322565 A1 | 12/2010 | George et al. |
| 2012/0081994 A1 | 4/2012 | Huson et al. |
| 2013/0183100 A1* | 7/2013 | Olivier ............... 405/158 |
| 2014/0185409 A1 | 7/2014 | Voldsbekk |
| 2014/0185411 A1 | 7/2014 | Voldsbekk |
| 2014/0185412 A1 | 7/2014 | Voldsbekk |
| 2014/0254310 A1 | 9/2014 | Voldsbekk |

FOREIGN PATENT DOCUMENTS

| | | |
|---|---|---|
| GB | 2480530 A | 11/2011 |
| WO | WO02/29948 A1 | 4/2002 |
| WO | WO2004/036252 A1 | 4/2004 |
| WO | WO2004/079398 A1 | 9/2004 |

* cited by examiner

RIGID-STEM SURVEY METHOD AND SYSTEM

BACKGROUND

The present invention relates generally to the field of marine surveying. More particularly, in one or more embodiments, this invention relates to using a rigid-stem assembly comprising a plurality of interconnected rigid stems in a marine seismic survey.

Techniques for marine surveying include marine geophysical surveying, such as seismic surveying and EM surveying, in which geophysical data may be collected from below the Earth's surface. Geophysical surveying has applications in mineral and energy exploration and production to help identify locations of hydrocarbon-bearing formations. Marine geophysical surveying is typically performed using one or more "streamers" towed below or near the surface of a body of water. The streamers are typically cables that include a plurality of sensors disposed thereon at spaced apart locations along the length of the cable. The sensors may be configured to generate a signal that is related to a parameter being measured by the sensor. An energy source may also be towed through the water by the same or a different vessel. At selected times, the energy source may be actuated to generate, for example, seismic or EM energy that travels downwardly into the subsurface rock. Seismic or EM energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

In geophysical surveying, the streamer is typically a cable that is stored on a drum. The streamers are typically made of multiple components, such as electrical conductors, fiber optics, and stress-supporting members, all bundled together and covered with a protective outer skin. The streamer may be up to several kilometers in length. A lead-in is typically a cable that couples the streamer to the survey vessel. The lead-in may also be stored on a drum, typically the same drum as the streamer. To deploy, retrieve, and store the cables, cable-handling systems are employed that may include a storage drum in combination with sheaves, blocks, and other turns where a smaller angle of cable direction changes occurs are used. When one section of the streamer is taken off, repaired, or replaced, drums often with a smaller diameter are used. In operation, one of the drums is holding back the tension in the deployed cable with its turning moment. In order to avoid load concentration on the cable, it may be beneficial to have many rounds of cable inside the drum while applying force. Thus, the innermost drum, which is the storage drum, is often used to hold back the tension.

The drum causes a number of restrictions and costly features on the streamers, especially in combination with rigid elements such as connectors, electronics housing, and sensor spacers. For example, the streamer typically should be capable of handling large deformations as a result of storage on the drums, thus limiting the available alternatives for the outer skin of the streamer. Accordingly, options for treating the streamer for drag reduction and antifouling may be limited. In addition, certain streamers, such as gel-filled cables, may encounter large, undesired deformations in shape due to storage on the drum, preventing their re-use. For various reasons, some of the streamer components may be external to the cable and attached via connection points to the outside. These external components typically cannot be attached to the cable until the cable is unwound from the drum during deployment. To reduce the complexity associated with this attachment process, there has been an ongoing effort to place these components inside the outer skin of the cable. However, placement of the equipment inside the outer skin is not always practical as adapting a solution for incorporating these components into a cable that is wound onto a drum can be challenging.

Accordingly, there is a need for improved methods and systems for deploying and recovering streamers and other equipment in marine seismic surveys.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine surveying. More particularly, in one or more embodiments, this invention relates to using a rigid-stem assembly comprising a plurality of interconnected rigid stems in a marine seismic survey. One or more rigid-stem assemblies in accordance with embodiments of the present invention may be used to form at least part of a device towed from a survey vessel, including seismic streamers and lead-ins, that are conventionally in the form of flexible cables. The rigid stems may be assembled on a survey vessel to form one or more long rigid-stem assemblies that can be deployed in the water. Streamer components, such as electrical or optical conductors, seismic sensors, and other electronics may be arranged in the rigid stems. The rigid stems can have a round cross-section or have other shapes, such as wing-shaped cross-section for low drag or un-symmetric cross-section for optimization of properties or response.

Figure 1:
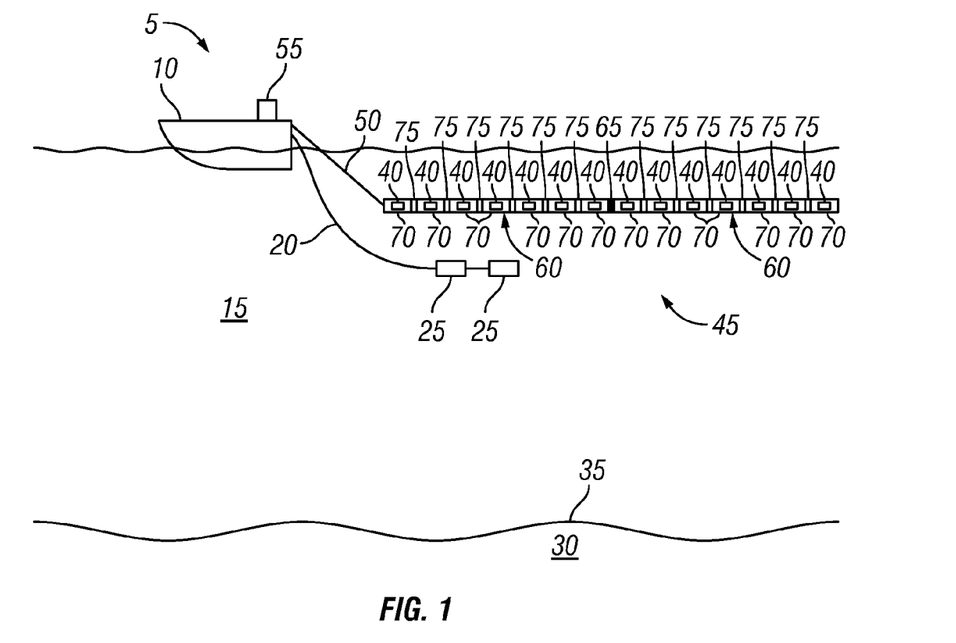
FIG. 1 illustrates an example embodiment of a marine seismic survey system using a sensor streamer that comprises a rigid-stem assembly.

FIG. 1 illustrates a marine seismic survey system 5 in accordance with embodiments of the present invention. In the illustrated embodiment, the system 5 may include a survey vessel 10 that moves along the surface of a body of water 15, such as a lake or ocean. The survey vessel 10 or a different vessel (not shown) can tow a source cable 20 that includes one or more seismic energy sources 25. In other embodiments (not shown), one or more of the seismic energy sources 25 may be mounted to the hull of the survey vessel 10. The seismic energy sources 25 may be any selectively actuable sources suitable for subsurface seismic surveying, including without limitation seismic air guns, water guns, vibrators or arrays of such devices. As energy is emitted by the seismic energy sources 25, it travels downwardly through the body of water 15 and rock formations 30 below the water bottom 35. Reflected energy may be detected by seismic sensors 40 disposed along a streamer 45 towed by the survey vessel 10 or another vessel. A lead-in 50 may couple the streamer 45 to the survey vessel 10. In the illustrated embodiment, the lead-in 50 may comprise a cable. The seismic sensors 40 may be disposed on the streamer 45 at spaced apart locations. The type of the seismic sensors 40 is not a limit on the scope of the present invention and may be hydrophones or other pressure responsive sensors, geophones, accelerometers or other motion respective sensors, or combinations thereof.

Signals generated by the seismic sensors 40 may be communicated to equipment on the survey vessel 10, shown generally at 55 and referred to for convenience as a "recording system." The recording system 55 typically includes devices (none shown separately) for navigating the survey vessel 10, for actuating the seismic energy sources 25, for example, electrical controller with swept frequency alternating current or other signal, and for recording signals generated by the seismic sensors 40.

The streamer 45 may be formed, for example, by coupling a plurality of rigid-stem streamer assemblies 60 end-to-end. As illustrated, two rigid-stem streamer assemblies 60 may be coupled end-to-end, for example, at connection point 65. It is contemplated that more than two rigid-stem streamer assemblies 60 may be used in embodiments of the present invention. Each of the rigid-stem streamer assemblies 60 may comprise a plurality of interconnected rigid streamer stems 70. Streamer stem joints 75 may be disposed at the intersection of adjacent rigid streamer stems 70 for mechanically joining the adjacent rigid streamer stems 70 together. While not illustrated, a streamer stem joint 75 may not be used, in some embodiments, to couple at least one pair of adjacent rigid streamer stems 70 leaving an open joint. As previously mentioned, the streamer components (e.g., conductors, seismic sensors 40, and other electronics) may be disposed in the rigid streamer stems 70. For example, seismic sensors, such as motion sensors, may be disposed inside the rigid streamer stems 70 with the sensing water motion relative to the streamer 45 being the motion sensed by the rigid streamer stems 70. By way of further example, channels or other membranes (not shown) may be provided in the rigid streamer stems for seismic sensors, such as hydrophones, for containing the pressure signal from the body of water 15. In the illustrated embodiment, the seismic sensors 40 are incorporated into the rigid streamer stems 70. While the present example, shows only one streamer 45, the invention is applicable to any number of laterally spaced apart streamers towed by survey vessel 10 or any other vessel. For example, in some embodiments, 8 or more laterally spaced apart streamers may be towed by the survey vessel 10, while in other embodiments, up to 26 or more laterally spaced apart streamers may be towed by survey vessel 10. Advantageously, when towing multiple streamers (such as streamer 45 on FIG. 1) that contain the rigid-stem streamer assemblies 60, the streamers may be held at independent positions, both laterally and vertically (relative to the tow path). For example, one of the streamers may be held at or near the surface while the other streamers may be positioned deeper in the body of water 15. In some embodiments, the streamer 45 may be towed at a depth of up to about 25 meters. In alternative embodiments, the streamer 45 may be towed at a deeper depth than is typically employed in seismic surveys. For example, the streamer 45 may be towed at a depth of up to about 50 meters or more.

Figure 2:
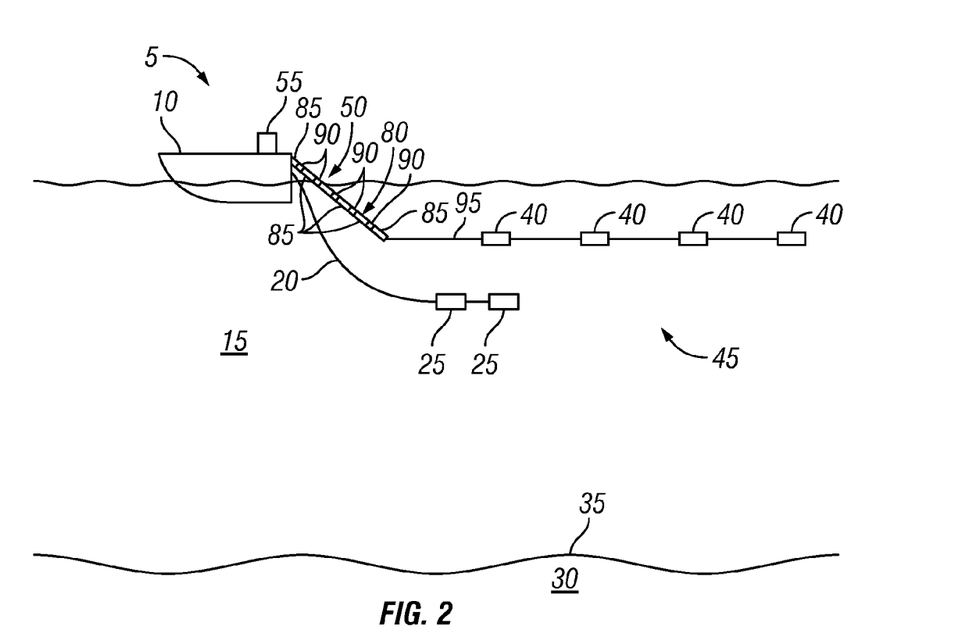
FIG. 2 illustrates another example embodiment of a marine seismic survey system using a lead-in that comprises a rigid-stem assembly.

FIG. 2 illustrates a marine seismic survey system 5 that utilizes a lead-in 50 that comprises a rigid-stem lead-in assembly 80 in accordance with embodiments of the present invention. While only a single rigid-stem lead-in assembly 80 is shown on FIG. 2, it is contemplated that more than one rigid-stem lead-in assembly 80 may be coupled end-to-end to form the lead-in 50. The rigid-stem lead-in assembly 80 may comprise a plurality of interconnected lead-in rigid stems 85 that are coupled using a lead-in stem joint 90. The lead-in 50 may be used, for example, to deploy the streamer 45 from the survey vessel 10 and to maintain the streamer 45 at a selected distance behind the survey vessel 10. In the illustrated embodiment, the streamer 45 comprises a cable 95 having seismic sensors 40 disposed thereon at spaced apart locations.

Figure 3:
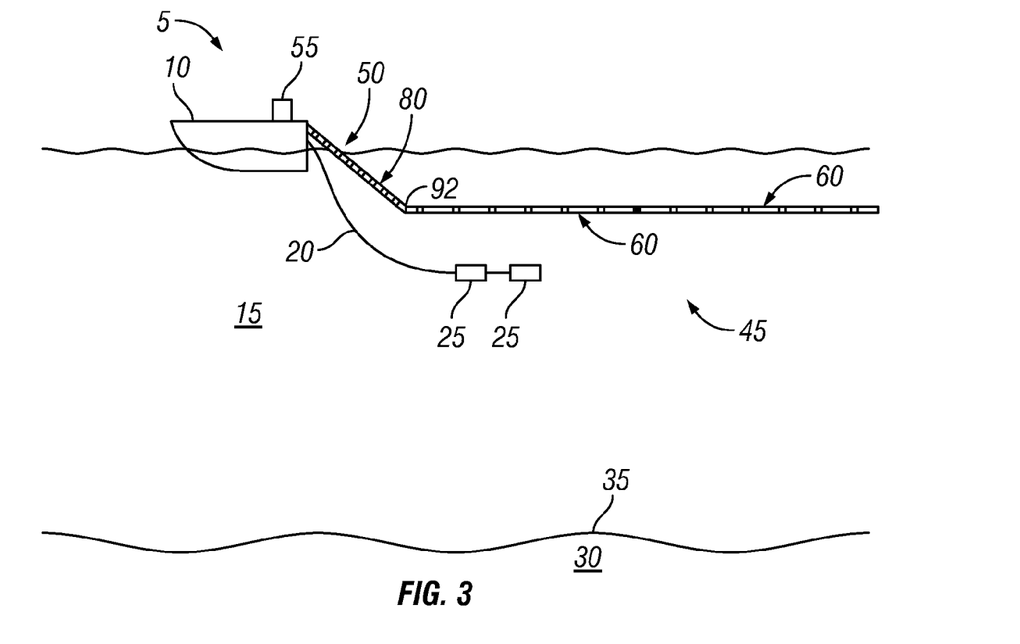
FIG. 3 illustrates another example embodiment of a marine seismic survey system using a sensor streamer and a lead-in that each comprises a rigid-stem assembly.

FIG. 3 illustrates a marine seismic survey system 5 that comprises a streamer 45 formed by coupling two rigid-stem streamer assemblies 60 end-to-end in accordance with embodiments of the present invention. As illustrated, the streamer 45 may be coupled to the survey vessel 10 by lead-in 50. In the illustrated embodiment, the lead-in 50 comprises a rigid-stem lead-in assembly 80. A flexible coupling element 92 may couple the lead-in 50 to the streamer 45 so that the streamer 45 can extend in a different direction in the body of water 15 than the lead-in 50.

While the preceding description of FIGS. 1-3 is directed to marine seismic surveying, it should be understood that embodiments of the present technique may be applicable to other types of marine surveying in which a sensor or other collecting device may be used to collect data while it is towed through the body of water 15. For example, rigid-stem assembly (e.g., rigid-stem lead-in assembly 80 on FIGS. 2 and 3 or rigid-stem streamer assemblies 60 on FIGS. 1 and 3) comprising a plurality of interconnected rigid stems may be used in other types of marine surveying such as when towing sensors, such as acoustic, motion. EM, sonar, or other suitable sensors for marine surveying. The sensors may be towed from elongated bodies or streamers, for example. In all these applications, the towed bodies or streamers may benefit from the use of the rigid-stem assembly instead of the towed-umbilical-on-winch concept that has been used previously.

Figure 4:
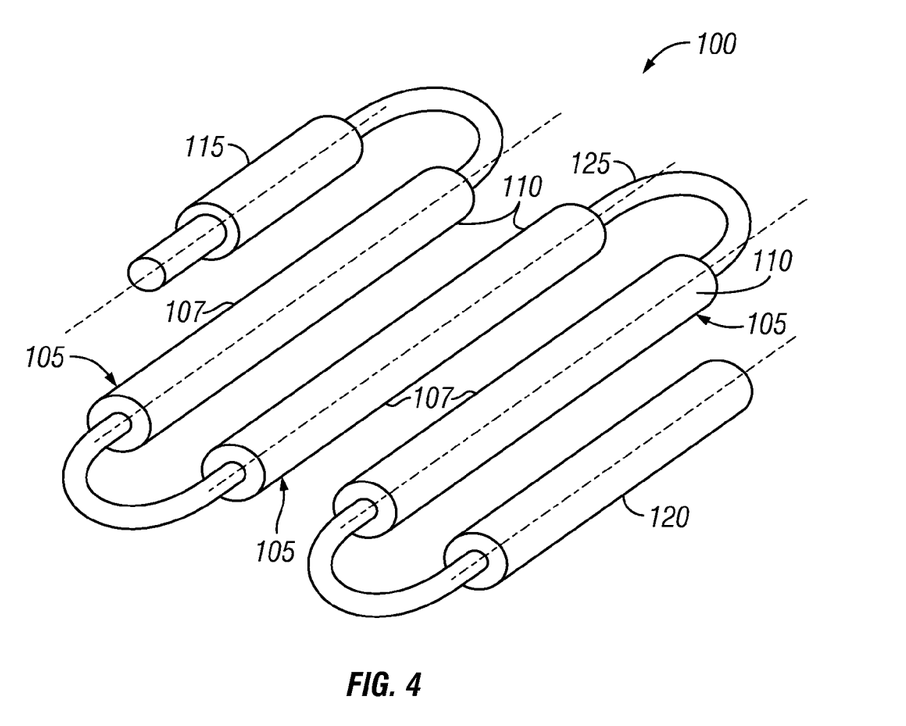
FIG. 4 illustrates a rigid-stem assembly in a de-coupled configuration in accordance with example embodiments of the present invention.

Referring now to FIG. 4, a rigid-stem assembly 100 is illustrated in more detail in accordance with embodiments of the present invention. The rigid-stem assembly 100 shown on FIG. 4 may be used to form at least part of a device towed from a survey vessel (e.g., survey vessel 10 on FIGS. 1-3), including seismic streamers (e.g., streamers 45 on FIGS. 1 and 3) and lead-ins (e.g. lead-in 50 on FIGS. 2 and 3) that are conventionally in the form of flexible cables. The rigid-stem assembly 100 may be a structure for a number of items, including feed lines, gas lines, optical and/or electrical signals, power, external devices, geophysical sensors, tension sensors, and geophysical sources. The rigid-stem assembly 100 is shown in a de-coupled configuration. In some embodiments, the rigid-stem assembly 100 may be stored on the survey vessel 10 in the de-coupled configuration and assembled prior to deployment into the body of water 15.

As illustrated, the rigid-stem assembly 100 may comprise a plurality of rigid stems 105. The rigid-stem assembly 100 (when assembled) is characterized as being rigid in that it has as bending, torsion, and/or inline stiffness than can be maintained for considerable lengths, for example, up to about 10 meters, about 50 meters, about 100 meters, or even longer. Unlike cables and structures that have been used previously as lead-ins and streamers, the rigid-stem assembly 100 should not exhibit catenary behavior over at least portions of the length, but should rather exhibit elastic behavior with deformation according to deformation of beams and not sinus hyperbolic or parabolic as for cables and the like. Accordingly, the rigid-stem assembly 100 when assembled cannot be stored and deployed from a drum, but rather may utilize a movable or fixed attachment point (e.g., detensioning apparatus 200 shown on FIGS. 7 and 8) for deployment from the survey vessel 10 (e.g., shown on FIG. 1). The attachment point can hold the rigid-stem assembly 100 by friction or a ring, for example. In some embodiments, the rigid-stem assembly 100 may be characterized as being rigid for a length of about 25 meters or longer wherein the rigid stems 105 have a smallest width or height of about 1 meter or less.

In some embodiments, the rigid-stem assembly 100 may have a bending stiffness of 700 Newton-square meters ("$Nm^2$") or greater for considerable lengths (e.g., over about 25 meters or more). The stiffness of 700 $Nm^2$ corresponds to a stiffness in a cantilever beam of 1-meter length fixed in one end with a load of 1 Newton in the other, deforming roughly 0.5 mm under the load. This corresponds to an aluminum (with Young's modulus of 70 GPa) tube with a 2-inch outer diameter and a thickness of 0.2 millimeters, a steel (with Young's modulus of 210 GPa) tube with a 2-inch outer diameter with a thickness of 0.03 millimeters or a circular rod with a Young's modulus of 2 GPa. Each of these items, i.e., the aluminum tube, the steel tube, and the circular rod, are examples of items with a bending stiffness of 700 $Nm^2$. A 2-inch outer diameter typically requires 5% deformation to be wound on a 2-meter drum, which is difficult for most materials. Most rigid materials can deform a maximum of 0.1% or, in extreme cases, 1% so they cannot be wound on a drum without being wound in a wire or umbilical. Lower strength materials may be able to deform but will then be soft to enable bending.

Embodiments of the present technique are for use with materials having a stiffness that make them difficult to take the rigid-stem assembly 100 on or off a drum. The rigidity will create a bending arm for the tension under which it is taken in or out. This distance multiplied with the tension, creates the load which the rigid-stem assembly 100 has to carry in the cross section of the first point of contact with the drum and is a critical load. The point of contact can be at or before the tangential point between the drum and the rigid-stem assembly 100 wherein the tangential point corresponds to no stiffness in the rigid-stem assembly 100 and bending arm of zero. Instruments used previously in marine surveying typically have several contributors to the bending arm. For example, sensors streamers may have repeaters, connectors, sensor housings and the like that can add to the bending arm. In addition, bend restrictors may also be placed in the ends to protect the wires inside which can add to the bending arm. Lead-Ins may also have several different contributors to increased bending arm, including reinforced umbilicals, solids such as gel filled, soft rigidified or the like, and true solids such as nylons, polyurethane, or compositions. For previous instruments used in marine surveying, the bending arm has been less than 0.3 m under a load of 3 kiloNewtons ("kN"). Some types will have almost the same bending arm for different loads (typically hinged joints and rigid bodies), other will deform much under increasing load and hence reduce bending arm (while load goes up), but all materials are limited in stiffness and have a certain deformation, even though the deformation can be very difficult to detect. Embodiments of the present technique may be used with a rigid-stem assembly 100 more rigid than 700 $Nm^2$. This is more rigid than other cable or streamer-based instruments that have been used hereto for and, thus, the bending arm can become larger than 0.3 m. The rigid-stem assembly 100 is then in danger of damage or permanent deformation if subjected to 3 kN or more, hence winching is not a good handling method.

The rigid stems 105 may each comprise a stem body 107. A variety of different materials and composites may be suitable for use in the stem body 107. In some embodiments, the stem body 107 may be made from a material comprising aluminum, stainless steel, or titanium. In some embodiments, the stem body 107 may be made from a material comprising a composite, such as glass- or carbon-reinforced plastics, such as glass or carbon fibers in combination with epoxy or other resins (e.g., polyester, vinyl ester, nylon, etc.). In some embodiments, the glass fibers may include e-glass fibers. In some embodiments, the stem body 107 may be made from a material comprising a plastic, such as polyethylene, polybutylene terephthalate, polysulphone, or another suitable thermoplastic polymer. Combinations of suitable materials may also be used. One of ordinary skill in the art, with the benefit of this disclosure, should be able to select an appropriate material for the stem body 107 based on a number of factors, including selection of an appropriate stiffness-to-weight while maintaining cost and bonding ability to available resins.

Figure 6A:
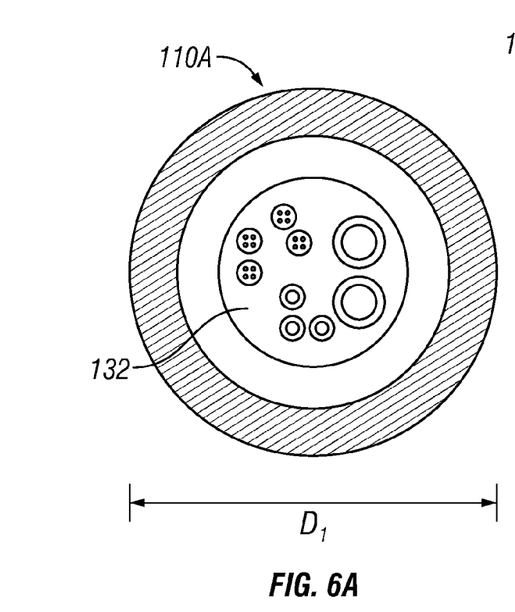
FIGS. 6A through 6C illustrate rigid-stem assemblies having different cross-sections in accordance with example embodiments of the present invention.
Figure 6B:
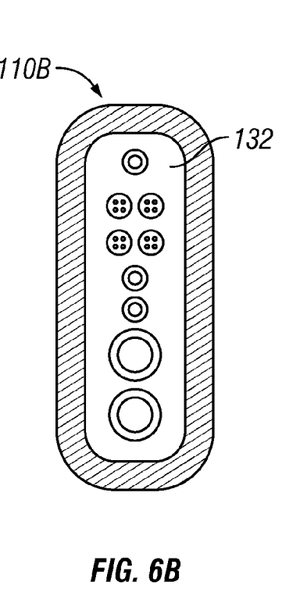
Figure 6C:
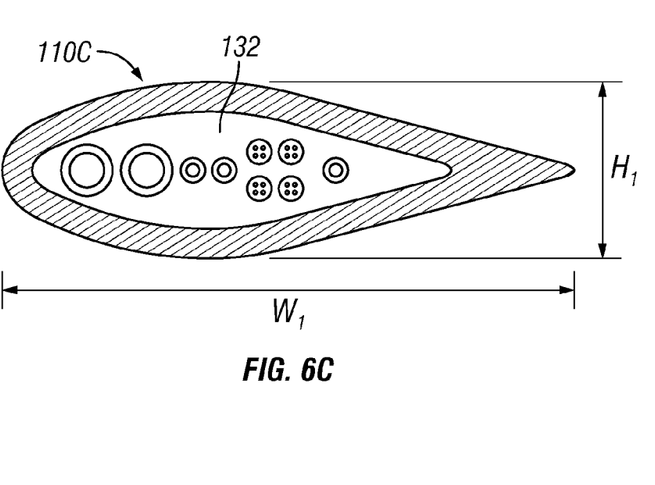

In some embodiments, the stem body 107 may be in the form of a pipe or other conduit that has a tubular portion that defines an interior chamber (e.g., interior chamber 132 shown on FIGS. 6A-6C). In some embodiments, a buoyant filler material may be used to fill the interior chamber. One example of a suitable buoyant filler material comprises air or other suitable gas. However, other buoyant filler materials may also be used to can provide some degree of positive buoyancy for ballasting as well as electrical insulation, including foams, gelled hydrocarbon-based oil, hydrocarbon-based oil, visco-elastic polymer or other suitable electrically insulating, acoustically transparent materials, for example. In some embodiments, surface treatments may be applied to the exterior surface 110 of the stem body 107, for example, to reduce drag and antifouling. For example, one or more antifouling agents may be applied to the exterior surface 110. By way of further example, one or more drag-reduction treatments may be applied the exterior surface 110. While FIG. 4 illustrates the rigid-stem assembly 100 having three rigid stems 105, it should be understood that embodiments of the rigid-stem assembly 100 may include more or less than three rigid stems 105, as desired for a particular application.

The rigid stems 105 may each have a length, for example, in a range of from about 1.5 meters to about 50 meters or, alternatively, from about 3 meters to about 12.5 meters. In specific embodiments, the rigid stems 105 may each have a length of about 3.125 meters, about 6.125 meters, or about 12.5 meters. The rigid stems 105 may each have an outer diameter (e.g., $D_1$ on FIG. 6a) in a range of from about 0.02 meters to about 0.2 meters or, in alternative embodiments, of about 0.04 meters to about 0.08 meters, for embodiments with a circular-shaped cross-section, for example. The rigid stems 105 may each have a width ($W_1$ on FIG. 6C) in a range of from about 0.1 meters to about 0.5 meters and a height ($H_1$ on FIG. 6C) up to about 0.4 meters, for embodiments with a wing-shaped cross-section, for example. In some embodiments, the rigid stems 105 may an aspect ratio (ratio of width to height) of about 1 to about 20, about 2 to about 20, or about 1 to about 8. When assembled, the rigid-stem assembly 100 may have a length, for example, in a range of from about 50 meters to about 1000 meters. If more than one rigid-stem assembly 100 is joined end-to-end, the combined assembly may have a length in a range of from about 200 meters to about 2000 meters or longer, for example. In some embodiments, the combined assembly may have a length of up to about 16000 meters, which may be used, for example, with towing depths of a few to several hundred meters.

In some embodiments, the rigid-stem assembly 100 may further comprise end connector elements, at either end of rigid-stem assembly 100. In the illustrated embodiment, the rigid-stem assembly 100 comprises as a male-type end connector element 115 at one end and a female-type end connector element 120 at the opposite end. The end connector elements should be configured for connection to corresponding connector elements (not shown) disposed at the longitudinal ends of adjacent rigid-stem lead-in assemblies. Each of the end connector elements can make mechanical and electrical connection to corresponding end connector elements on the other rigid-stem assembly (not shown).

In some embodiments, a flexible cable 125, which may be an electrical or optical conductor, for example, extends between the rigid stems 105. In some embodiments, the flexible cable 125 may conduct a gas, such as air, for maintenance of air volumes, ballasting, and recover, as well as supply to air guns, which may be on the rigid-stem assembly 100, for example. As illustrated, the flexible cable 125 may extend from either end of the rigid-stem assembly 100 between the connector elements (e.g., from the male-type connector element 115 to the female-type connector element 120). The flexible cable 125 may extend through the interior chamber in the rigid stems 105. In some embodiments, the flexible cable 125 may comprise multiple cables extending through the passageway.

While not shown on FIG. 4, sensors, actuators, transducers, and other electronics (e.g., tanks, batteries, etc.) may also be incorporated into the rigid stems 105. Example sensors that may be incorporated include sound/pressure sensors, motion sensors (speed, velocity, and/or acceleration), EM sensors, magnetism (e.g., compass), pressure/depth sensors, tension sensors, surface or bottom echosounders/mappers. Examples of transducers include sound/pressure for acoustic positions, lateral (e.g., to maintain network of positions for several instruments, inline (e.g., bending/water properties), bottom (height) or surface (depth), and electro-magnetic. In some embodiments, one or more actuators may be incorporated into the rigid stems 105. Example actuators may include control surfaces, ballast tanks, openings, covers/lids, and connection points, among others. For example, control surfaces (such as wings) for steering or rotational position may be used. The control surfaces may act to provide depth and/or lateral control for the rigid stems 105. Moreover, the control surfaces may allow the rigid stems 105 to perform a desired move while in the water, such as an undulation, surfacing, diving, rescue, or recovery. Ballast tanks may be also be incorporated that can allow the rigid stems 105 to maintain depth, surface, or compensate for water intrusion, such as by gassing a flooded chamber in the rigid stem 105. Openings may also be provided for access to sensor surfaces, ballast, and/or weight/mass center manipulation. Connection points that are openable and/or closable may also be provided in the rigid stems 105, such as valves or ports for feed or transmission lines. Covers/lids that are openable and/or closable may also be provided, which may enable cleaning and/or streamlined handling, for example.

Figure 5:
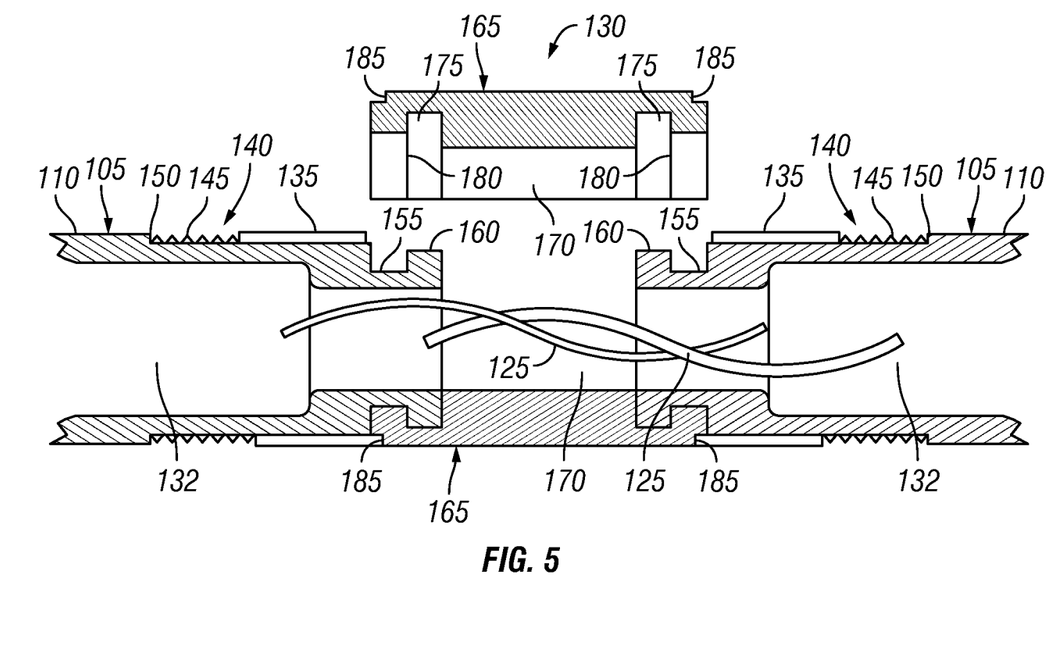
FIG. 5 illustrates coupling of two rigid stems in accordance with example embodiments of the present invention.

FIG. 5 illustrates two adjacent rigid stems 105 coupled together by a stem joint 130 in accordance with embodiments of the present invention. To maintain rigidity of the rigid-stem assembly 100 (e.g., shown on FIG. 4), the stem joint 130 may form a rigid connection between the adjacent rigid stems 105. As illustrated, the rigid stems 105 may each have an interior volume 132 with flexible cables 125 extending between the rigid stems 105 running through the rigid stems 105 by way of the interior chamber 132. In accordance with present embodiments, sleeves 135 may be used for holding the stem joint 130 in clamping position to couple the rigid stems 105. The ends portions 140 of each of the rigid stems 105 may comprise a sleeve 135. The sleeves 135 may be slidably moveable on the end portions 140. The sleeves 135 may each be spring loaded by a corresponding spring 145. The outer surface 110 of each of the rigid stems 105 may comprise a shoulder 150 for receiving the corresponding spring 145. The end portions 140 of each of the rigid stems 105 may further comprise a notch 155 that defines a shoulder 160.

The stem joint 130 may comprise two clamp portions 165. The clamp portions 165 should cooperate with one another so that, when the stem joint 130 is assembled, the clamp portions 165 define a rigid-stem passage that receives at least a portion of the end portions 140 of the rigid stems 105. In some embodiments, each of the clamp portions 165 may have a C-shaped cross-section. It should be understood that the cross-section of the clamp portions 165 may vary, for example, based on the particular configuration of the rigid stems 105. The clamp portions 165 may each have an interior surface 170. The interior surfaces 170 may each have recesses 175 at either end therein that engage the corresponding shoulders 160 of the end portions 140 when the stem joint 130 is assembled. The recesses 175 may each extend around the interior surface 170 at either end of the corresponding clamp portion 165. A clamping shoulder 180 may be defined by each of the recesses 175. The clamping shoulders 180 may engage the corresponding notches 155 in the end portions 140 when the stem joint 130 is assembled. Each end of the clamp portions 165 may further comprise an exterior shoulder 185 for receiving the corresponding sleeve 135. Each of the sleeves 135 slides into the corresponding exterior shoulders 185 to fasten the clamp portions 165 in clamping position to couple the rigid stems 105, as shown by the one of the clamp portions 165 in the lower portion of FIG. 5.

Embodiments of the present invention are not limited to the stem joint 130 illustrated by FIG. 5. It should be understood that other types of connectors may be used to couple the rigid stems 105 to one another. Examples of connectors that may be used for the stem joint 130 include, without limitation, a locking nut with inline pin, socket connections, face, and mating plane orthogonal to main axis.

It should be understood that the shape of the cross-section of the rigid stems 105 need not be circular, but may vary as desired for a particular application. The rigid stems 105 may have, for example, an oval-, circular-, triangular-, square-, pentagonal-, other polygonal-, wing-, or non-symmetrical-shaped cross-section. FIGS. 6A through 6C illustrate rigid stems 105 having differently shaped cross-sections. FIG. 6A illustrates a rigid stem 105A having a circular-shaped cross-section. FIG. 6B illustrates a rigid stem 105B having a rectangular-shaped cross-section. FIG. 6C illustrates a rigid stem 105C having a flat or wing-shaped cross-section. The wing-shaped cross-section may be desirable, for example, to reduce the drag coefficient for the rigid-stem assembly 100. A reduced drag coefficient may particularly beneficial for lead-ins (e.g., lead-in 50 on FIGS. 2 and 3) where substantial cross-flow may be encountered. In some embodiments (not illustrated), the wing-shaped cross-section may have an asymmetric wing profile, which may be beneficial, for example, to provide one-side lift. The wing-shaped cross section may have ratio of width W1 to height H1 of greater than about and, alternatively, greater than about 1.5. In some embodiments, the wing-shaped cross section may have a ratio of width W1 to height H1 in a range of from about 1 to about 10. FIGS. 6A through 6C further illustrate the rigid stems 105 having an interior chamber 132, which may include various cables, such as electrical or optical cables, for example.

Figure 7:
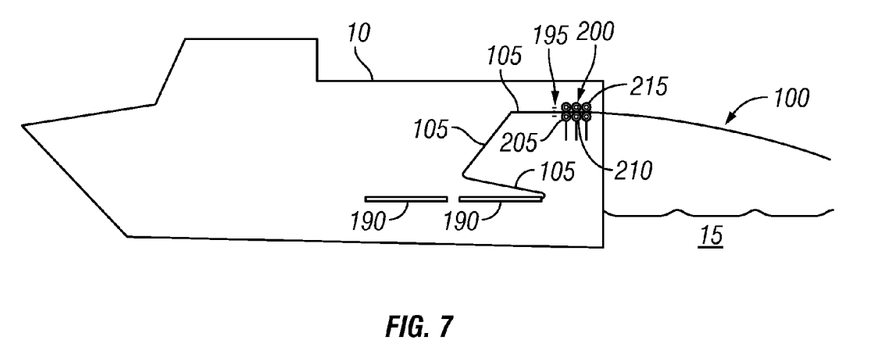
FIGS. 7 and 8 illustrate deployment of a rigid-stem assembly from a survey vessel wherein a de-tensioning apparatus holds the rigid-stem assembly in accordance with example embodiments of the present invention.
Figure 8:
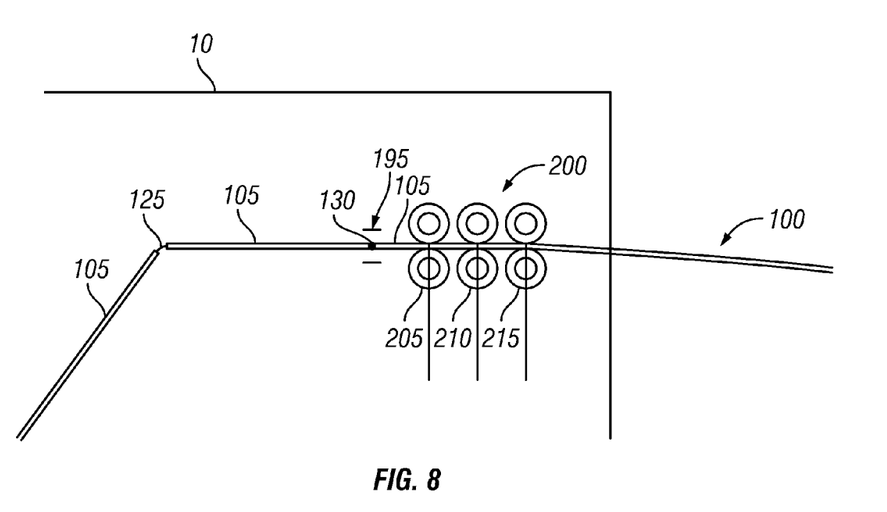

With reference now to FIGS. 7 and 8, an example method for deploying a rigid-stem assembly 100 from a survey vessel 10 will be described. For example, one or more rigid-stem assemblies 100 in accordance with embodiments of the present invention may be assembled and deployed from the survey vessel 10. The one or more rigid-stem assemblies 100 may be used to form at least part of a device towed from a survey vessel, including seismic streamers and lead-ins that are conventionally in the form of flexible cables. As will be seen below, the stiffness of the rigid-stem assembly 100 may be activated at deployment and then de-activated upon retrieval.

In some embodiments, the rigid-stem assembly 100 may be removed from one or more storage bins 190. For example, one of the rigid stems 105 making up the rigid-stem assembly 100 may be lifted from the storage bins 190. In some embodiments, the rigid stems 105 making up the rigid-stem assembly 100 may continuously removed from the storage bins 190 one after another. As illustrated by FIG. 7, the one or more storage bins 190 may be disposed on the survey vessel 10. The storage bins 190 may comprise, for example, pallets, receptacles, or other type of space for storing the rigid-stem assembly 100. In some embodiments, a rigid-stem assembly 100 comprising a plurality of de-coupled rigid stems 105 may be stored in each of the storage bins 190 on the survey vessel 10. In some embodiments, the rigid-stem assembly 100 in each of the storage bins 190 may comprise at least one flexible cable 125 extending between the connector elements (e.g., flexible cable 125 extending from the male-type connector element 115 to the female-type connector element 120 on FIG. 4). As shown by FIG. 4, example embodiments of the flexible cable 125 may turn approximately 180° between adjacent rigid stems 105 to minimize the space needed for storage.

In some embodiments, there may be a device (not shown) for removing the rigid-stems 05 from the storage bins 190. For example, the device may lift the rigid stems 105 from the storage bins 190. After being removed from the storage bins, the rigid-stem assembly 100 may be conveyed to the rigid-stem connection line 195 whose purpose is to couple the rigid stems 105 to adjacent rigid stems 105 using, for example, stem joints 130. In some embodiments, the stem joints 130 may be coupled between adjacent rigid stems 105, for example, by sliding a sleeve on the rigid stems 105 over into clamping engagement with the stem joints 130. The rigid-stem connection line 195 may be manual or at least partially automated, for example. In some embodiments, one or more individuals may manually couple the adjacent rigid stems 105 to each other. In alternative embodiments, a device may be used for coupling the adjacent rigid stems 105 to each other.

After coupling the adjacent rigid stems 105, the rigid-stem assembly 100 may be conveyed to the detensioning apparatus 200. The detensioning apparatus 200 holds the rigid-stem assembly 100 to remove tension on the rigid-stem assembly 100 caused by the portion of the rigid-stem assembly 100 deployed in the body of water 15. The detensioning apparatus 200 may be located proximate the rigid-stem connection line 195. As illustrated by FIGS. 7 and 8, the detensioning apparatus 200 may be disposed on the survey vessel 10. In some embodiments, the detensioning apparatus 200 pulls the rigid-stem assembly 100 from the storage bins 190 to the rigid-stem connection line 195. From the rigid-stem connection line 195, the detensioning apparatus 200 may deploy the rigid-stem assembly 100 into the body of water 15. As illustrated by FIG. 7, the rigid-stem assembly may bend down as it is deployed into the body of water 15. In alternative embodiments, the rigid-stem assembly 100 may bend up, for example, when the level of the body of water 15 is high or if the detensioning apparatus 200 is pivoting. The detensioning apparatus 200 may comprise one or more wheel pairs that engage the rigid-stem assembly 100. In the illustrated embodiment, the detensioning apparatus 200 comprises three wheel pairs 205, 210, 215. The detensioning apparatus 200 may apply tension to the rigid-stem assembly 100 by application of torque to the wheel pairs 205, 210, 215. In some embodiments, the detensioning apparatus 200 can apply more tension per wheel pair 205, 210, or 215, because the rigid-stem assembly 100 has a more rigid exterior surface than the previously used cables. It should be understood that other types of devices may be used for application of tension to the rigid-stem assembly 100. While not illustrated, the detensioning apparatus 200 may comprise, for example, clamps that engage shoulders on the rigid stems 105 or grooves or chamfers on the rigid stems 105; clamps in belts or in pistons or other linear machines that apply force to the rigid stems 105; a hook or other attachment device on a rope coupled to an attachment on the rigid stems 105, or pins that enter holes on the rigid stems 105 and which may be spring driven.

In some embodiments, more than one rigid-stem assembly 100 may be assembled and deployed from the survey vessel 10. To deploy multiple rigid-stem assemblies 100, the rigid-stem assemblies 100 should be coupled end-to-end. The end connector element at one end of a rigid-stein assembly 100 should be coupled to the corresponding end connector element of the other rigid-stem assembly 100. In some embodiments, each of the rigid-stem assemblies 100 may be stored in separated storage bins 190.

With continued reference to FIGS. 7 and 8, an example method for retrieving the rigid-stem assembly 100 onto the survey vessel 10 will now be described. In some embodiments, the detensioning apparatus 200 may pull the rigid-stem assembly 100 onto the survey vessel 100 to retrieve the rigid-stem assembly 100. The detensioning apparatus 200 may also hold the rigid-stem assembly 100 to remove tension from the rigid-stem assembly after the rigid-stem assembly 100 is back on board the survey vessel 10. After the detensioning apparatus 200, the rigid-stem assembly 100 may be conveyed to the rigid-stem connection line 195 for de-coupling adjacent rigid stems 105. For example, the rigid-stem connection line 195 may function to remove the stem joints 130 that interconnect the adjacent rigid stems 105, which de-coupling may be manual or at least partially automated. Once de-coupled, the rigid-stem assembly 100 can be placed into one of the storage bins 190. In some embodiments, the rigid-stem assembly 100 can be folded as it is placed into the storage bins 190. FIGS. 7 and 8 illustrate vertical folding of the rigid-stem assembly 100. The folding may be performed under the back deck, in front of the back deck, or where space on the survey vessel 10 is most reasonably available. In alternative embodiments, the folding may be formed sideways, for example, in a shallow troth, which could exploit a wide back deck without requiring space outside. It should be understood that if multiple rigid-stem assemblies 100 have been deployed, the rigid-stem assemblies 100 may need to be disconnected, for example, to store each rigid-stem assembly 100 in a separate one of the storage bins 190.

Figure 9:
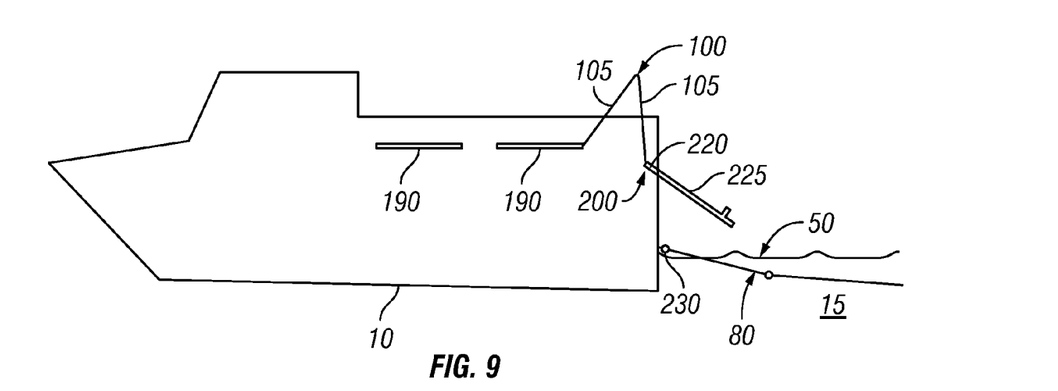
FIG. 9 illustrates additional details of the de-tensioning apparatus of FIGS. 7 and 8 in accordance with example embodiments of the present invention.

FIG. 9 illustrates an example embodiment that includes detensioning apparatus 200 that comprises a hinge point 220. In some embodiments, the hinge point 220 may pivot in at least 2 directions. It should be understood that the body of water 15 can exert forces on the rigid-stem assembly 100 as the rigid-stem assembly 100 is deployed in the water. This may be problematic if the rigid-stem assembly 100 is not allowed to pivot with respect to the survey vessel 10. The hinge point 200 may, for example, allow the rigid-stem assembly 100 to point in a direction caused by the water forces. In the illustrated embodiment, a hinged bar 225 extends from the hinge point 220. The hinged bar 225 may slidably receive the rigid-stem assembly 100. FIG. 9 further illustrates an example embodiment that includes a connection point 230 for coupling a lead-in 50 comprising a rigid-stem lead-in assembly 80 to the stern of the survey vessel 10. In some embodiments, the connection point 230 may be a hinged connection. After the lead-in 50 has been deployed from the detensioning apparatus 200, the lead-in 50 may be moved from the detensioning apparatus 200 to the connection point 50. Because the connection point 230 is closer to the body of water 15, lifting in and out of the body of water 15 may be controlled while also reducing splash loads on the front of the lead-in 50. For example, by coupling the lead-in 50 from the connection point 50, air span from the proximal end of the lead-in 50 to the water may be reduced.

Accordingly, embodiments may include using a rigid-stem assembly comprising a plurality of interconnected rigid stems in a marine survey. Some advantages of employing the rigid-stem assembly may include one or more of the following. One of the many potential advantages is that the rigid stems have a larger interior volume as compared to the previously used cables, thus making the rigid-stem assembly particularly advantageous for embodiments where sensors, actuators, transducers, and other electronics (e.g., tanks, batteries, etc.) may be incorporated into the rigid stems, such as where the rigid-stem assembly is used to form at least part of a seismic streamer. Another one of the many potential advantages is that the rigid-stem assembly can be made stiffer and lighter than the previously used cables. For streamers, embodiments of the lighter rigid-stem assembly may allow use of heavier and more efficient stress members which can be used in combination with air rather than oil or gels for the buoyancy material. Yet another one of the many potential advantages is that the stiffness of the rigid-stem assembly should provide less elongation, creep and shape or position change. Furthermore, due to the increased stiffness, better signal reception may be received from the streamer because of better signal reception by noise filtering, less elongation, creep and more stable shape and position of the seismic sensors. Additionally, reduced drag (e.g., from drag-reducing surface treatment, smoother outside) and having anti-fouling surfaces (e.g., from application of antifouling agents), may also provide better signal reception. Yet another one of the many potential advantages is that rigid-stem assembly should be less susceptible to rotation and tangling, which can be beneficial for both streamers and lead-ins.

Figure 10:
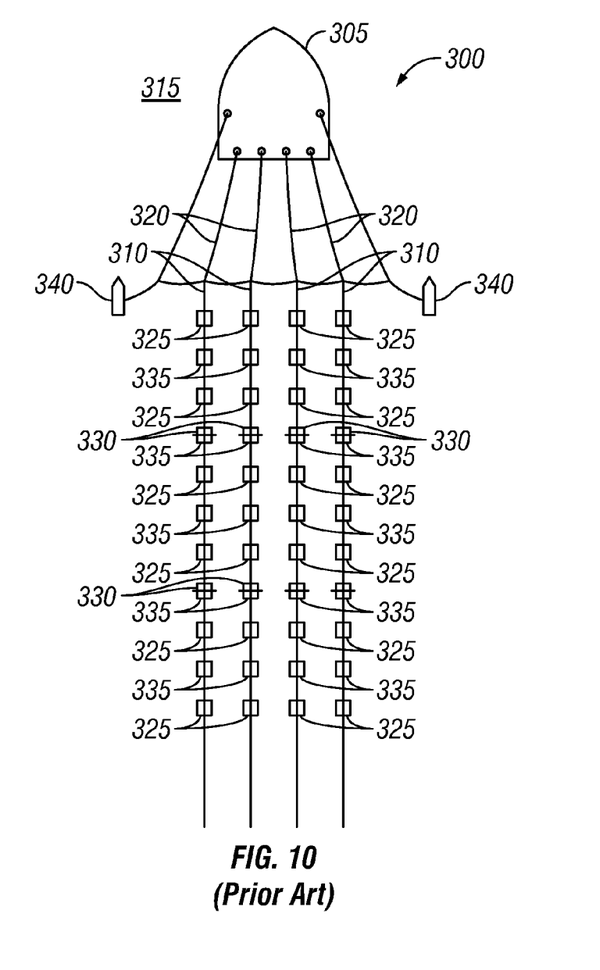
FIG. 10 illustrates a conventional seismic survey system.

In contrast to systems that use rigid-stem assemblies comprising a plurality of interconnected rigid stems in a marine survey, FIG. 10 illustrates a conventional seismic survey system 300. As illustrated, the seismic survey system 300 may include a survey vessel 305 towing a plurality of sensor streamers 310 through a body of water 315. Lead-in lines 320 may be used to couple the sensor streamers 310 to the survey vessel 305. Each of the sensor streamers 310 may include sensors 325. The sensor streamers 305 may also include lateral force and depth ("LFD") control devices 330 (e.g., "birds") and associated acoustic range sensing devices 335, which can be disposed at selected positions along the sensor streamers 305 collocated with the LDF devices 330 or at separate positions. Spreading devices 340, such as doors or paravanes, may be used to maintain lateral separation of the sensor streamers 305. Unlike the system illustrated by FIG. 10, embodiments of the present invention that use rigid-stem assemblies in a survey may contain almost no buoys, doors, paravanes, chains or extra ropes, or LFD devices, such as birds. For example, a seismic survey may be performed that only has the desired lights and antennas above the water.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A geophysical survey method comprising:
   deploying a rigid-stem assembly from a survey vessel into a body of water, wherein the rigid-stem assembly comprises a plurality of rigid stems that are interconnected end to end, wherein each of the rigid stems comprises a stem body defining one or more interior chambers, wherein each of the rigid stems has a length of from about 1.5 meters to about 50 meters;
   towing the rigid-stem assembly from the survey vessel through the body of water; and
   either (1) detecting a geophysical signal with a sensor towed by the survey vessel, and/or (2) activating a geophysical source that is towed by the survey vessel.

2. The method of claim 1, wherein the rigid-stem assembly functions as at least one of: a lead-in coupling a streamer to the survey vessel, a streamer bearing the sensor, or a source cable for towing the geophysical source.

3. The method of claim 1, wherein the rigid-stem assembly is coupled end-to-end to another rigid-stem assembly.

4. The method of claim 1, further comprising removing the rigid stems from a storage bin, the rigid stems being in a de-coupled state, interconnecting the rigid stems to form the rigid-stem assembly, and conveying the rigid-stem assembly to a detensioning apparatus that deploys the rigid-stem assembly into the body of water.

5. The method of claim 4, wherein the interconnecting the rigid stems comprises coupling stem joints between the rigid stems, wherein sliding sleeves on end portions of each of the rigid stems are moved to place the rigid stems in clamping engagement with the stem joints.

6. The method of claim 4, further comprising moving the rigid-stem assembly from the detensioning apparatus to a connection point on the stern of the survey vessel.

7. The method of claim 1, further comprising retrieving the rigid-stem assembly onto the survey vessel, wherein the step of retrieving the rigid-stem assembly comprises: pulling the rigid-stem assembly onto the survey vessel, decoupling the rigid stems, and placing the rigid-stem assembly in a storage bin, the rigid stems being in a de-coupled state in the storage bin.

8. A marine survey system, comprising:
a survey vessel;
a detensioning apparatus disposed on the survey vessel;
a plurality of rigid stems disposed on the survey vessel, wherein each of the rigid stems comprises a stem body defining one or more interior chambers, and wherein each of the rigid stems has a length of from about 1.5 meters to about 50 meters; and
a rigid-stem connection line configured to interconnect at least a portion of the rigid stems end to end to form an interconnected rigid-stem assembly.

9. The marine survey system of claim 8, further comprising the rigid-stem assembly, wherein the rigid-stem assembly is held by the detensioning apparatus and has a distal end in a body of water.

10. The marine survey system of claim 9, wherein the rigid-stem assembly is rigid for a length of about 25 meters or longer, the rigid-stem assembly having a smallest height or width of about 1 meters, and wherein the rigid-stern assembly has a bending stiffness of 700 Nm² over the length of about 25 meters or longer.

11. The marine survey system of claim 9, wherein the rigid-stem assembly comprises at least one of a lead-in coupling a streamer to the survey vessel, a streamer bearing a sensor, or a source cable for towing a geophysical source.

12. The marine survey system of claim 11, wherein the sensor comprises a seismic sensor.

13. The marine survey system of claim 9, wherein the rigid stems each have a generally wing-shaped cross section.

14. The marine survey system of claim 9, wherein the rigid-stem assembly has a length in a range of from about 50 meters to about 1,000 meters.

15. The marine survey system of claim 9, wherein a flexible cable extends between the rigid stems.

16. The marine survey system of claim 9, wherein stem joints are disposed at intersections of the interconnected rigid stems for mechanically connecting the interconnected rigid stems to one another.

17. The marine survey system of claim 16, wherein end portions of the rigid stems each comprise a sleeve slidably movable on the respective end portion for holding stem joints in clamping position to mechanically connect the interconnected rigid stems to one another.

18. The marine survey system of claim 9, wherein the rigid-stem assembly is coupled to an end of another rigid-stem assembly comprising a plurality of interconnected rigid stems.

19. The marine survey system of claim 8, wherein the detensioning apparatus comprises a wheel pair.

20. A rigid-stem handling system, comprising:
a storage bin holding a plurality of rigid stems having an elastic cable extending between the rigid stems, wherein each of the rigid stems comprises a stem body defining one or more interior chambers, and wherein each of the rigid stems has a length of from about 1.5 meters to about 50 meters;
a rigid-stem connection line configured to receive the rigid stems from the storage bin and connect the rigid stems end-to-end to form a rigid-stem assembly comprising a plurality of interconnected rigid stems; and
a detensioning apparatus configured to receive the rigid-stem assembly from the rigid-stem connection line and hold the rigid-stem assembly while deploying the rigid-stem assembly from a survey vessel.

21. The rigid-stem handling system of claim 20, wherein the storage bins comprise a pallet.

22. The rigid-stem handling system of claim 20, wherein the detensioning apparatus comprises a wheel pair.

23. A rigid-stem handling system comprising:
a storage bin holding a plurality of rigid stems having an elastic cable extending between the rigid stems;
a rigid-stem connection line configured to receive rigid stems from the storage bin and connect the rigid stems end-to-end to form a rigid-stem assembly comprising a plurality of interconnected rigid stems wherein the rigid-stem assembly is rigid for a length of about 25 meters or longer, the rigid-stem assembly having a smallest height or width of about 1 meters, and wherein the rigid-stem assembly has a bending stiffness of 700 Nm² over the length of about 25 meters or longer; and
a detensioning apparatus configured to receive the rigid-stem assembly from the rigid-stem connection line and hold the rigid-stem assembly while deploying the rigid-stem assembly from a survey vessel.

24. The method of claim 1, wherein the rigid-stem assembly is rigid for a length of about 25 meters or longer, the rigid-stem assembly having a smallest height or width of about 1 meters, and wherein the rigid-stem assembly has a bending stiffness of 700 Nm² over the length of about 25 meters or longer.

* * * * *